(12) United States Patent
Adamopoulos

(10) Patent No.: US 7,637,984 B2
(45) Date of Patent: Dec. 29, 2009

(54) INTEGRATED SEPARATION AND PURIFICATION PROCESS

(75) Inventor: Eleftherios Adamopoulos, Gurnee, IL (US)

(73) Assignee: UOP LLC, Des Plaines, IL (US)

( * ) Notice: Subject to any disclaimer, the term of this patent is extended or adjusted under 35 U.S.C. 154(b) by 714 days.

(21) Appl. No.: 11/537,334

(22) Filed: Sep. 29, 2006

(65) Prior Publication Data
US 2008/0078294 A1 Apr. 3, 2008

(51) Int. Cl.
*B01D 53/22* (2006.01)
*B01D 59/12* (2006.01)

(52) U.S. Cl. .................. 95/45; 95/51; 95/55; 95/235; 95/236; 96/4; 423/228

(58) Field of Classification Search .............. 95/45, 95/51, 55, 235, 236; 96/4; 423/228
See application file for complete search history.

(56) References Cited

U.S. PATENT DOCUMENTS

| | | | |
|---|---|---|---|
| 3,361,133 A | 1/1968 | Kutsher et al. | |
| 3,594,985 A * | 7/1971 | Ameen et al. ............ | 95/163 |
| 4,330,305 A | 5/1982 | Kuessner et al. | |
| 4,552,572 A | 11/1985 | Galstaun ................ | 55/36 |
| 4,599,096 A * | 7/1986 | Burr ..................... | 62/624 |
| 4,602,477 A * | 7/1986 | Lucadamo ............... | 62/624 |
| 4,608,060 A | 8/1986 | Kulprathipanja et al. | |
| 4,659,343 A | 4/1987 | Kelly .................... | 55/16 |
| 4,830,734 A | 5/1989 | Nagji et al. | |
| 4,964,888 A | 10/1990 | Miller | |
| 5,021,232 A | 6/1991 | Hise et al. .............. | 423/574 |
| 5,152,976 A | 10/1992 | Fong et al. | |

(Continued)

FOREIGN PATENT DOCUMENTS

CA 2 532 317 1/2005

OTHER PUBLICATIONS

M. Holysh, "Coke Gasification: Advance Technology for Separation and Capture of CO2 from Gasifier Process Producing Electrical Power, Steam and Hydrogen", Carbon Dioxide Capture for Storage in Deep Geological Formations—Results from the CO2 Capture Project, Elsevier Ltd., Oxford, UK (2005), V1 257-271.

(Continued)

*Primary Examiner*—Jason M Greene
*Assistant Examiner*—Anthony Shumate
(74) *Attorney, Agent, or Firm*—Mark Goldberg

(57) ABSTRACT

Increasing the economic and environmental compatibility in treatment processes in sour gas production. For 25 yr, Mobil Erdgas Erdoel GmbH (MEEG) has been treating considerable amounts of sour gas in N. Germany. In 9 fields with different gas qualities, there are ca 30 producing wells. The main processes of the sour gas production and treatment are described. The gas is dried at the well site and if the reservoir pressure is not sufficient, compressed for transportation to the central processing facility. In most cases the use of sulfur solvents is necessary at the wells. Natural gas scrubbers for the total removal of hydrogen sulfide and Claus units with downstream units to obtain sulfur are utilized. To increase the environmental compatibility and economics, a number of secondary processes have been introduced for emission control; glycol stripping; and the Purisol, Selexol, Sulfinol, and Claus processes.

20 Claims, 3 Drawing Sheets

U.S. PATENT DOCUMENTS

| | | | |
|---|---|---|---|
| 5,411,721 A | | 5/1995 | Doshi et al. |
| 5,435,836 A | * | 7/1995 | Anand et al. .................... 95/45 |
| 5,702,503 A | | 12/1997 | Tse Tang |
| 5,861,051 A | | 1/1999 | Critchfield et al. |
| 6,090,356 A | * | 7/2000 | Jahnke et al. ................ 423/210 |
| 6,203,599 B1 | | 3/2001 | Schubert et al. |
| 6,210,466 B1 | | 4/2001 | Whysall et al. |
| 6,416,568 B1 | | 7/2002 | Wallace et al. ................. 95/55 |
| 6,592,749 B1 | | 7/2003 | Lokhandwala et al. ...... 208/102 |
| 6,977,007 B2 | * | 12/2005 | Siadous et al. ................. 95/55 |
| 2004/0099138 A1 | * | 5/2004 | Karode et al. ................ 95/214 |
| 2004/0159233 A1 | | 8/2004 | Simmons et al. ............... 95/45 |
| 2006/0260189 A1 | * | 11/2006 | Reddy et al. .................. 48/128 |

OTHER PUBLICATIONS

R.A. Knight, et al., "A Process to Produce Medium-BTU Gas from Coal", AIChE 1990 Spring National Meeting (Orlando Mar. 18-22, 1990) Preprint N. 100b.

R. Kettner, N. Liermann, "Increasing the Economic and Environmental Compatibility in Treatment Processes for Sour Gas Production", $8^{th}$ OGEW/DGMK Mineral Oil & the Environ. Joint Mtg., (Graz, Austria, Oct. 22-23, 1992) Proc. (ISSN 0938—068X; ISBN 3-928164-39-2) 125-143 (1992) Petroleum Abstracts (ISSN 0031-6423) Abstr. No, 559, V33 N.41 (Oct. 9, 1993). German w/English Abstract.

* cited by examiner

INTEGRATED SEPARATION AND PURIFICATION PROCESS

FIELD OF THE INVENTION

The invention relates generally to fluid separation and, more particularly, an Integrated Gasification Combined Cycle (IGCC) system for generating electricity and/or steam as well as isolating multiple components from a synthesis gas stream.

BACKGROUND OF THE INVENTION

Gasification is a commercially proven technology that efficiently converts petroleum coke, coal, heavy oil streams and even natural gas into synthesis gas through a non-combustion, partial oxidation reaction.

Synthesis gas can be used as a cleaner-burning fuel for gas turbines, such as in an IGCC system, to produce electricity and/or steam. In addition to generating electricity and/or steam, synthesis gas can also be used to generate hydrogen for use in heavy oil upgraders and hydroprocessing units in a refinery. Further, synthesis gas components such as hydrogen, carbon monoxide, carbon dioxide and nitrogen constitute the basic building blocks of may valuable chemical products such as oxo-alcohols, methanol, ammonia, Fischer-Tropsch liquids, e.g., ultra-low sulfur diesel, plastics and chemical fertilizers.

The raw synthesis gas stream is typically subjected to one or more separation processes depending on the type of products to be produced by the IGCC system. One gas separation process which is generally necessary in an IGCC system is the selective removal of sulfur compounds such as carbonyl sulfide and hydrogen sulfide from the raw synthesis gas.

The removal of such sulfur-containing compounds is desirable for many reasons, depending in part upon the intended use of the final gas product. Since a large percentage of the produced synthesis gas is typically used as fuel in a gas turbine, the presence of sulfur-containing compounds is generally objectionable because of one or more concerns such as, involving: safety, corrosion and pollution as well as the unpleasant odor commonly associated with the sulfur-containing compounds. Additionally, such sulfur-containing compounds can have a deleterious effect on downstream equipment and systems used for the production of hydrogen and other chemicals.

One separation technique used to remove sulfur-containing compounds from the raw synthesis gas stream involves contacting the raw synthesis gas stream with a solvent to selectively absorb the sulfur-containing compounds. However, as the liquid solvent selectively absorbs sulfur compounds from the raw synthesis gas stream, it also co-absorbs carbon dioxide. The co-absorbed carbon dioxide, if not removed upstream of a sulfur recovery unit such as, for example, a Claus unit, can negatively impact the capital and operating costs of the sulfur recovery unit. Advantageously, recovery of the co-absorbed carbon dioxide results in additional power generation.

Using nitrogen to strip co-absorbed carbon dioxide from the liquid solvent presents advantages over using treated, i.e., sulfur-free, synthesis gas. For example, hydrogen losses from the sulfide absorption unit are minimized if nitrogen is used.

Although nitrogen is readily available from an air separation unit supplying the oxygen required for gasification, the purity of the nitrogen stream used for stripping typically needs to be upgraded from about 97% to 99.9% by volume. Further, depending on where the nitrogen is being utilized within the sulfide absorption unit, compression may be required. As will be appreciated by those skilled in the art, the production or even procurement of the high-purity, compressed nitrogen which is generally required to effectively strip carbon dioxide from the liquid solvent can detrimentally add to the expense associated with the production of desired product gases.

Additional processes for removing sulfur-containing compounds and/or carbon dioxide from gas streams are described in U.S. Pat. No. 3,362,133 to Kutsher et al., U.S. Pat. No. 4,330,305 to Kuessner et al., U.S. Pat. No. 5,861,051 to Critchfield et al., and U.S. Pat. No. 6,203,599 to Schubert et al.

In addition to a sulfide absorption unit, a synthesis gas processing block typically also includes one or more purification and/or recovery units such as, for example, a sulfur recovery unit and hydrogen separation and purification units. Such purification and/or recovery units generally produce byproduct or waste streams which may contain residual levels of the components desirably isolated by the purification and/or recovery units such as, for example, carbon dioxide, hydrogen and sulfur-containing compounds. Typically, such byproduct or waste streams, depending upon chemical composition, may be recycled into the synthesis gas processing block, off-gassed or combusted as fuel. The fate of such byproduct or waste streams may largely depend upon the costs, both monetary and in terms of energy expenditures, needed to recover the residual levels of desirable compounds.

Thus, there is a need and a demand for processing schemes that improve the efficiency and economics of separating at least hydrogen sulfide and carbon dioxide from a fluid stream.

There is a further need and a demand for processes for separating at least hydrogen sulfide and carbon dioxide from a fluid stream having reduced dependence upon external gas inputs.

There is an additional need and a demand for processes for the separation of hydrogen sulfide and carbon dioxide from a fluid stream which are effective to result in an increased recovery of desired and/or beneficial gases from process byproduct or waste streams.

SUMMARY OF THE INVENTION

A general objective of the invention is to provide an improved processing scheme and arrangement for generating power and/or steam, and/or producing hydrogen and other industrially useful chemical components from a fluid stream, such as a gasifier effluent stream in an integrated gasification combined cycle (IGCC) system.

A more specific objective of the invention is to overcome one or more of the problems described above.

The general object of the invention can be attained, at least in part, through a processing scheme for separating carbon dioxide from a fluid stream including at least hydrogen sulfide, carbon dioxide and hydrogen. In accordance with one embodiment, such a processing scheme involves contacting the fluid stream with a solvent in an absorbent zone to form a hydrogen sulfide-rich solvent stream and a sulfur-free fluid stream. The hydrogen sulfide-rich solvent stream contains at least hydrogen sulfide and a first portion of the carbon dioxide. The sulfur-free fluid stream includes at least hydrogen and a second portion of the carbon dioxide. The processing scheme further involves contacting at least one first gas permeable membrane element in a first membrane separation zone with a first portion of the sulfur-free fluid stream to produce a hydrogen-enriched permeate stream and a first non-permeate stream containing at least carbon dioxide. A first portion of the first non-permeate stream contacts at least one second gas permeable membrane element in a second membrane separation zone to produce a carbon dioxide-enriched permeate stream and a second non-permeate stream. At least a portion of the second non-permeate stream contacts the hydrogen sulfide-rich solvent stream in a carbon dioxide stripping zone to produce a hydrogen sulfide-enriched solvent stream and a carbon dioxide-enriched fluid stream.

The prior art generally fails to provide a processing scheme and arrangement that is as economical and efficient in generating power, steam, hydrogen and/or other industrially beneficial compounds as may be desired compared to conventional processes such as may be used in IGCC systems.

In accordance with another embodiment, a processing scheme for separating hydrogen sulfide and carbon dioxide from a fluid stream containing at least hydrogen sulfide, carbon dioxide and hydrogen involves contacting the fluid stream with a solvent in an absorption zone to produce a hydrogen sulfide-rich solvent stream and a sulfur-free fluid stream. The hydrogen sulfide-rich solvent stream includes at least hydrogen sulfide and a first portion of the carbon dioxide. The sulfur-free fluid stream includes at least hydrogen and a second portion of the carbon dioxide. The processing scheme further involves contacting at least one hollow fiber membrane element in a first membrane separation zone with a first portion of the sulfur-free fluid stream to produce a hydrogen-enriched permeate stream and a first non-permeate stream containing at least carbon dioxide. A first portion of the first non-permeate stream is treated by contacting at least one spiral wound membrane element in a second membrane separation zone to produce a carbon dioxide-enriched permeate stream and a second non-permeate stream. The second non-permeate stream contains less than five percent by volume carbon dioxide. The processing scheme still further involves treating the hydrogen-enriched permeate stream in a pressure swing adsorption unit to produce a purified hydrogen stream and a pressure swing adsorption tail gas stream. The hydrogen sulfide-rich solvent stream is treated by contacting the hydrogen sulfide-rich solvent stream with at least a portion of the second non-permeate stream in a carbon dioxide stripping zone to produce a hydrogen sulfide-enriched solvent stream and a carbon dioxide-enriched fluid stream. The hydrogen sulfide-enriched solvent stream is treated in a hydrogen sulfide stripping zone to produce a hydrogen sulfide-depleted solvent stream and a hydrogen sulfide-enriched fluid stream. The hydrogen sulfide-enriched fluid stream is treated in a sulfur recovery unit to produce an elemental sulfur stream and a sulfur recovery tail gas stream. The processing scheme additionally involves combining at least a portion of the pressure swing adsorption tail gas stream with the sulfur recovery tail gas stream to produce a combined tail gas stream. At least a first portion of the combined tail gas stream is combined with the fluid stream containing at least hydrogen sulfide, carbon dioxide and hydrogen prior to entering the absorption zone.

In accordance with a further embodiment, a processing scheme for separating hydrogen sulfide and carbon dioxide from a fluid stream containing at least hydrogen sulfide, carbon dioxide and hydrogen involves contacting the fluid stream with a physical solvent in an acid gas separation zone to produce at least a sulfur-free fluid stream, a carbon dioxide-enriched fluid stream and a hydrogen sulfide-enriched fluid stream. The sulfur-free fluid stream includes at least hydrogen and a first portion of the carbon dioxide. The hydrogen sulfide-enriched fluid stream includes at least hydrogen sulfide. The processing scheme further involves contacting at least one gas permeable membrane element in a membrane separation zone with a first portion of the sulfur-free fluid stream to produce at least a hydrogen-enriched permeate stream and a non-permeate stream. At least a portion of the hydrogen-enriched permeate stream is treated in a pressure swing adsorption unit to produce a purified hydrogen stream and a pressure swing adsorption tail gas stream. The hydrogen sulfide-enriched fluid stream is treated in a sulfur recovery unit to produce an elemental sulfur stream and a sulfur recovery tail gas stream. The processing scheme additionally involves combining at least a portion of the pressure swing adsorption tail gas stream with the sulfur recovery tail gas stream to produce a combined tail gas stream. The combined tail gas stream is compressed in a compression zone to produce a compressed tail gas stream. At least a first portion of the compressed tail gas stream is combined with the fluid stream to produce a combined fluid stream which is subsequently treated in the acid gas separation zone.

The invention further comprehends a system for separating hydrogen sulfide and carbon dioxide from a fluid stream containing at least hydrogen sulfide, carbon dioxide and hydrogen. The system includes an absorbent zone wherein a solvent contacts the fluid stream to produce a hydrogen sulfide-rich solvent stream containing at least hydrogen sulfide and a first portion of the carbon dioxide, and a sulfur-free fluid stream containing at least hydrogen and a second portion of the carbon dioxide. The system further includes at least one membrane separation zone. The at least one membrane zone includes at least one gas permeable membrane element wherein a first portion of the sulfur-free fluid stream contacts the at least one gas permeable membrane element to produce a hydrogen-enriched permeate stream and a non-permeate stream. The system also includes a pressure swing adsorption unit wherein at least a portion of the hydrogen-enriched permeate stream is treated to produce a purified hydrogen stream and a pressure swing adsorption tail gas stream. The system additionally includes a carbon dioxide stripping zone wherein at least a portion of the non-permeate stream contacts the hydrogen sulfide-rich solvent to produce a carbon dioxide-enriched fluid stream and a hydrogen sulfide-enriched solvent stream, and a hydrogen sulfide stripping zone wherein at least a portion of the hydrogen sulfide-enriched solvent is treated to produce a hydrogen sulfide-depleted solvent and a hydrogen sulfide-enriched fluid stream. The system further includes a sulfur recovery unit wherein at least a portion of the hydrogen sulfide-enriched fluid stream is treated to produce an elemental sulfur stream and a sulfur recovery tail gas stream.

Other objectives and advantages will be apparent to those skilled in the art from the following detailed description taken in conjunction with the appended claims and drawings.

DETAILED DESCRIPTION OF THE INVENTION

Integrated gas combined cycle (IGCC) processes generally include several separation, recovery and/or purification processes to treat a fluid stream containing at least hydrogen sulfide, carbon dioxide and hydrogen produced from the gasification of a hydrocarbon-containing feedstock in a gasifier.

Figure 1:
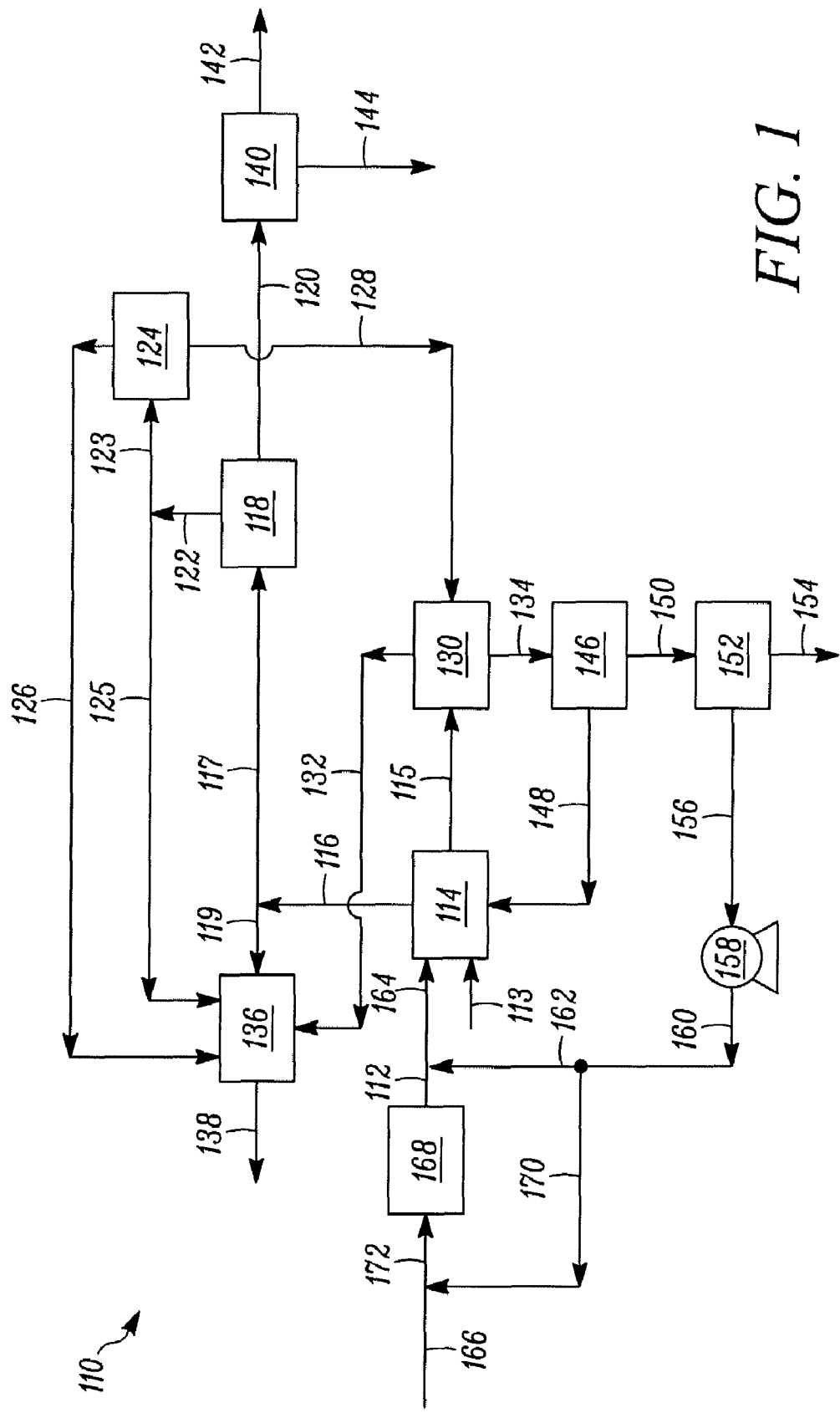
FIG. 1 is a simplified schematic of an improved processing scheme for the separation of hydrogen sulfide and carbon dioxide from a fluid stream containing at least hydrogen sulfide carbon dioxide and hydrogen in accordance with one embodiment.

FIG. 1 schematically illustrates a processing scheme 110 for separating hydrogen sulfide and carbon dioxide from a fluid stream 112 containing at least hydrogen sulfide, carbon dioxide and hydrogen. The processing scheme 110 involves contacting the fluid stream 112 with a solvent 113 in an absorption zone 114 to produce a sulfur-free fluid stream 116 containing at least hydrogen and a first portion of the carbon dioxide, and a hydrogen sulfide-rich solvent stream 115 containing at least hydrogen sulfide and a second portion of the carbon dioxide. As used herein the term "sulfur-free fluid stream" refers to a fluid stream containing less than about 1 ppm by volume hydrogen sulfide. In accordance with certain embodiments, the sulfur-free fluid stream 116 includes or contains about 35% to about 50% by volume hydrogen.

The solvent 113 employed within the absorption zone 114 may be any material which selectively absorbs hydrogen sulfide. Solvents which can be employed in the absorption zone may include, but are not limited to, solvents such as dialkyl ethers of polyethylene glycols such as dimethyl ethers of polyethylene glycols, diethyl ethers of polyethylene glycols, methyl isopropyl ethers of polyethylene glycols and combinations thereof, mono- or diethanolamine, methyldiethanolamine, and promoted methyldiethanolamine solutions such as mixtures of methyldiethanolamine and 2-(2-aminoethoxy)ethanol. The properties and uses of such solvents are more fully described in U.S. Pat. No. 6,203,599 to Schubert et al., U.S. Pat. No. 4,330,305 to Kuessner et al., U.S. Pat. No. 3,362,133 to Kutsher et al., and U.S. Pat. No. 5,861,051 to Critchfield et al.; the contents of each of these patents are hereby incorporated by reference. In accordance with certain embodiments, the solvent employed in the absorption zone 114 includes a dimethyl ether of polyethylene glycol.

The processing scheme 110 further involves treating at least a first portion 117 of the sulfur-free fluid stream 116 by contacting at least one first gas permeable membrane element in a first membrane separation zone 118 with the first portion 117 to produce a hydrogen-enriched permeate stream 120 and a first non-permeate stream 122 containing at least carbon dioxide. Such treatment in the first membrane separation zone 118 generally includes a gas membrane separation unit wherein the hydrogen and, in certain embodiments, select additional components contained in the first portion 117 of the sulfur-free fluid stream 116 permeate through the at least one gas permeable membrane element and are collected to produce the hydrogen-enriched permeate stream 120. Components of the first portion 117 of the sulfur-free fluid stream 116 which do not permeate through the at least one gas permeable membrane element are collected and exit the first membrane separation zone 118 as the first non-permeate stream 122. In accordance with certain embodiments, the hydrogen-enriched permeate stream 120 may include or contain about 70% to about 90% by volume hydrogen.

In accordance with certain embodiments, the first membrane separation zone 118 can include at least one hollow fiber gas permeable membrane element. In accordance with other embodiments, the first membrane separation zone 118 can include a multitude of hollow fiber gas permeable membrane elements connected to form separation arrays. Such separation arrays can generally desirably be employed in industrial installations wherein larger volumes of feedstock are processed. Materials and processes for forming and utilizing hollow fiber gas permeable membrane elements are more fully described in, for example, commonly assigned U.S. Pat. No. 5,411,721 to Doshi et al., the contents of which are hereby incorporated by reference.

A first portion 123 of the first non-permeate stream 122 is treated in a second membrane separation zone 124 wherein the first portion 123 contacts at least one second gas permeable membrane element to produce a carbon dioxide-enriched permeate stream 126 and a second non-permeate stream 128 (e.g., a carbon dioxide-lean non-permeate stream). In accordance with certain embodiments, up to about 10% by volume of the first non-permeate stream 122, i.e., the first portion 123, can be fed to the second membrane separation zone 124.

Such treatment in the second separation membrane zone 124 generally includes a gas membrane separation unit wherein the carbon dioxide and, in certain embodiments, select additional components contained in the first portion 123 of the first non-permeate stream 122 permeate through the at least one gas permeable membrane element and are collected to produce the carbon dioxide-enriched permeate stream 126. Components of the first portion 123 of the first non-permeate stream 122 which do not permeate through the at least one gas permeable membrane element are collected and exit the second membrane separation zone 124 as the second non-permeate stream 128. In accordance with certain embodiments, the second non-permeate stream 128 includes or contains less than about 5% by volume carbon dioxide. In accordance with certain other embodiments, the second non-permeate stream 128 includes or contains less than about 3% by volume carbon dioxide.

In accordance with certain embodiments, the second membrane separation zone 124 can include at least one spiral wound gas permeable membrane element. In accordance with other embodiments, the second membrane separation zone 124 can include a multitude of spiral wound gas permeable membrane elements connected to form separation arrays. Such separation arrays can generally be employed in processing schemes wherein in large volumes of feedstock may be processed. Materials and processes for forming and utilizing spiral wound gas permeable membrane elements are more fully described in, for example, commonly assigned U.S. Pat. No. 4,608,060 to Kulprathipanja et al. and commonly assigned U.S. Pat. No. 5,702,503 to Tang; the contents of each of these patents are hereby incorporated by reference.

The second non-permeate stream 128, or at least a select portion thereof, is used to remove the co-absorbed carbon dioxide in the hydrogen sulfide-rich solvent stream 115. Typically, the co-absorbed carbon dioxide in the hydrogen sulfide-rich solvent stream 115 is desorbed by heating said solvent stream 115 to a desired temperature and then contacting the heated hydrogen sulfide-rich solvent stream 115 with the second non-permeate stream 128, or a select portion thereof, in a carbon dioxide stripping zone 130. Generally, the carbon dioxide which has been stripped from the hydrogen sulfide-rich solvent stream 115 is absorbed by the second non-permeate stream 128 to produce a carbon dioxide-enriched fluid stream 132 and a hydrogen sulfide-enriched solvent stream 134.

In accordance with certain embodiments, at least one of a second portion 119 of the sulfur-free fluid stream 116, a second portion 125 of the first non-permeate stream 122, the carbon dioxide-enriched permeate stream 126 and the carbon dioxide-enriched fluid stream 132 can be subsequently combusted in a gas turbine 136 to generate an electrical power output 138.

In accordance with other embodiments, the hydrogen-enriched permeate stream 120 may be subsequently treated in a pressure swing adsorption (PSA) unit 140 to produce a purified hydrogen stream 142 and a pressure swing adsorption tail gas stream 144. Such pressure swing adsorption unit 140 generally operates by adsorbing light gases such as carbon monoxide, methane, and carbon dioxide from the hydrogen-enriched permeate stream 120 onto a fixed bed of adsorbents. Adsorption of impurities occurs at a relatively high pressure. Hydrogen is adsorbed in only small amounts and can, therefore, be recovered as the purified hydrogen stream 142 at high pressure and purity after passing thorough the adsorbent bed. Typical purities for pressure swing adsorption hydrogen product streams range from 99 to 99.999% by volume. Regeneration of the adsorbent bed can be accomplished by reducing the pressure on the adsorbent to desorb the impurities into the pressure swing adsorption tail gas stream 144. In a processing scheme such as the one depicted in FIG. 1, the pressure swing adsorption unit 140 is typically operated at feed pressures ranging from about 1,825 kPa (about 265 psia) to about 2,520 kPa (about 365 psia). The purified hydrogen product 142 is collected at a pressure of about 70 kPa (about 10 psia) less than feed, and the pressure swing adsorption tail gas stream 144 is typically collected at a pressure of about 138 kPa (about 20 psia). In accordance with certain embodiments, the first non-permeate stream 120 can be compressed prior to entering the pressure swing adsorption unit 140.

Generally, such pressure swing adsorption units operate on a cyclic basis, with individual adsorber vessels cycled between adsorption and desorption steps. Multiple adsorbers are used in order to provide constant product and tail gas flows. Adsorbents are selected based on the type and quantity of impurities present in the feed stream and also the required degree of removal of such impurities. Such pressure swing adsorption units and their operation are more fully described, for example, in commonly assigned U.S. Pat. No. 4,964,888 to Miller and commonly assigned U.S. Pat. No. 6,210,466 to Whysall et al.; the contents of each of these patents are hereby incorporated by reference.

In accordance with further embodiments, the hydrogen sulfide-enriched solvent stream 134 may be treated in a hydrogen sulfide stripping zone 146 to produce a hydrogen sulfide-depleted solvent stream 148 and a hydrogen sulfide-enriched fluid stream 150. Generally, such treatment in the hydrogen sulfide stripping zone 146 involves a separation unit wherein the hydrogen sulfide-enriched solvent stream 134 is heated to strip the hydrogen sulfide from the solvent and produce the hydrogen sulfide depleted-solvent stream 148. Advantageously or beneficially, the sulfur-depleted solvent stream 148 may be combined with the solvent 113 in the absorption zone 114.

In accordance with certain further embodiments, the hydrogen sulfide-enriched fluid stream 150 may be treated in a sulfur recovery unit 152 to produce an elemental sulfur stream 154 and sulfur recovery tail gas stream 156. Such sulfur recovery unit 152 can be, for example, a Claus unit. In a Claus unit, hydrogen sulfide is first oxidized with air at high temperatures, i.e., in a range of about 1000° C. to about 1400° C., to produce elemental sulfur and sulfur dioxide. However, some of the hydrogen sulfide remains unreacted. This remaining hydrogen sulfide is then reacted catalytically, in two to three stages, with the formed sulfur dioxide to produce more elemental sulfur and water. A small amount of hydrogen sulfide remains in the produced sulfur recovery tail gas stream 156.

Advantageously or beneficially, the sulfur recovery tail gas stream 156 may be compressed in a compression train 158 to produce a compressed tail gas stream 160. At least a portion, such as a first portion 162, of the compressed tail gas stream 160 can be combined with the fluid stream 112 and the resulting combined stream 164 can be treated in the absorption zone 114 to recover or remove additional compounds via the process or processes described above.

Alternatively or additionally, all or at least a portion of the compressed tail gas stream 160 can be combined with a feed stream 166 and treated in a water shift reactor unit 168. For example, in accordance with certain embodiments, particularly embodiments in which increased production of hydrogen and/or carbon dioxide is desired, a second portion 170 of the compressed tail gas stream 160 can be combined with the feed stream 166 to form a combined feed stream 172. The combined feed stream 172 can then be treated in the water shift reactor 168 to provide the fluid stream 112.

In accordance with certain embodiments, the feed stream 166 can include a raw synthesis gas produced from gasification of petroleum coke, coal, heavy oil streams and/or natural gas.

Figure 2:
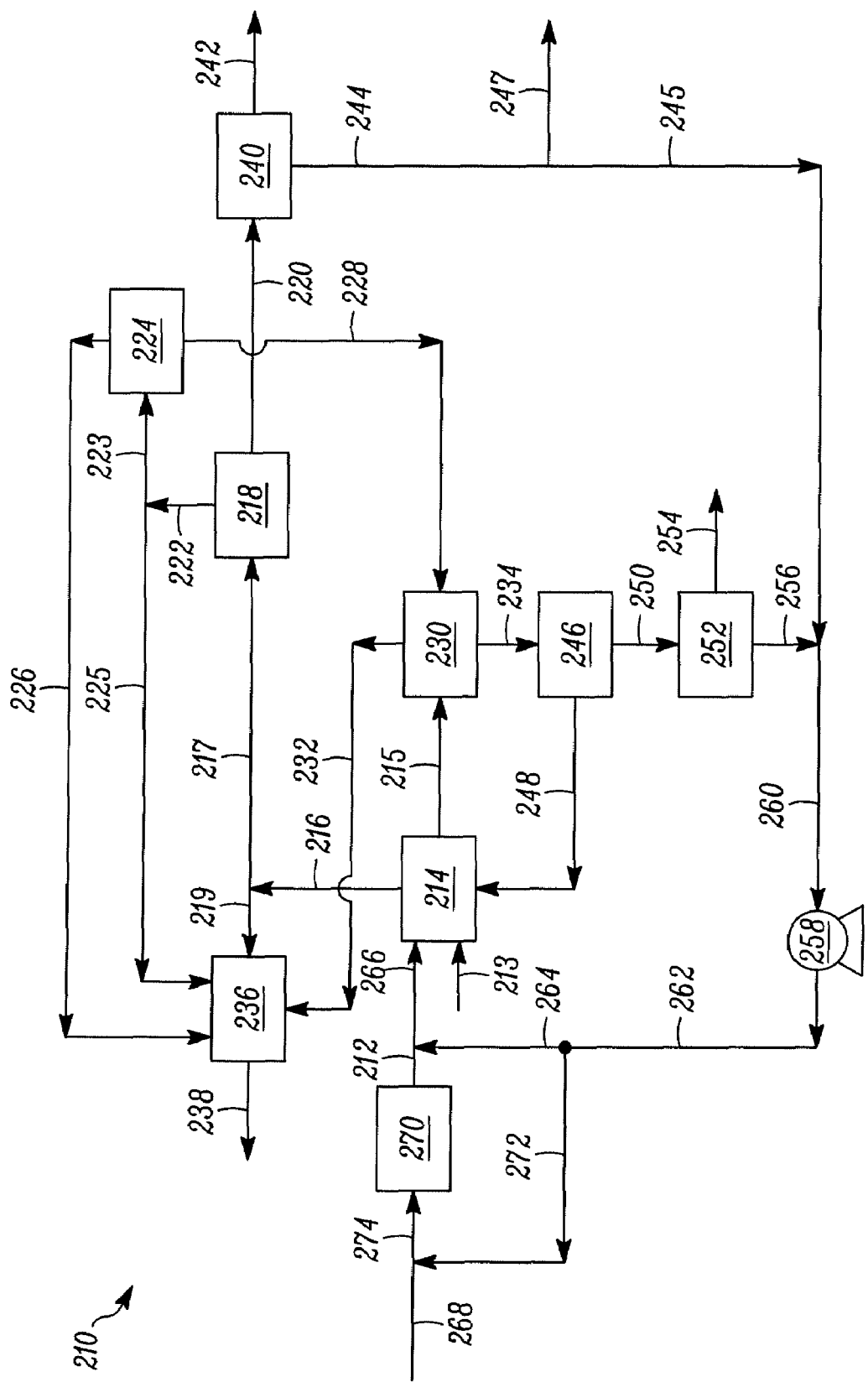
FIG. 2 is a simplified schematic of an improved processing scheme for the separation of hydrogen sulfide and carbon dioxide from a fluid stream containing at least hydrogen sulfide carbon dioxide and hydrogen in accordance with another embodiment.

In accordance with another embodiment, as shown in FIG. 2, a processing scheme 210, similar to the processing scheme 110 illustrated in FIG. 1, for separating hydrogen sulfide and carbon dioxide from a fluid stream 212 including at least hydrogen sulfide, carbon dioxide and hydrogen involves an absorption zone 214, a first membrane separation zone 218, a second membrane separation zone 224, a carbon dioxide stripping zone 230, a gas turbine 236, a pressure swing adsorption unit 240, a hydrogen sulfide stripping zone 246 and a sulfur recovery zone 252.

Similar to the processing scheme 110, the processing scheme 210 also involves contacting the fluid stream 212 with a solvent 213 in the absorbent zone 214 to produce a hydrogen sulfide-rich solvent stream 215 and a sulfur-free fluid stream 216 such as by the separation process described above in connection with the absorption zone 114, as shown in FIG. 1.

At least a first portion 217 of the sulfur-free fluid stream 216 is treated, such as by the separation process described in conjunction with the first membrane separation zone 118, as shown in FIG. 1, in the first membrane separation zone 218 to produce a hydrogen-enriched permeate stream 220 and a first non-permeate stream 222. A first portion 223 of the first non-permeate stream 222 is subsequently treated, such as by the separation process described above in connection with the second membrane separation zone 124, as shown in FIG. 1, in the second membrane separation zone 224 to produce a carbon dioxide-enriched permeate stream 226 and a second non-permeate stream 228. In accordance with certain embodiments, up to about 10% by volume of the first non-permeate stream 222, i.e., the first portion 223, may be fed to the second membrane separation zone 224.

The second non-permeate stream 228, or a select portion thereof, contacts the hydrogen sulfide-rich solvent stream 215 in the carbon dioxide stripping zone 230 to produce a carbon dioxide-enriched fluid stream 232 and a hydrogen sulfide-enriched solvent stream 234 such as by the separation process described above in conjunction with the carbon dioxide stripping zone 130, as shown in FIG. 1.

The hydrogen-enriched permeate stream 220, or a select portion thereof, is treated in the pressure swing adsorption unit 240 to produce a purified hydrogen stream 242 and a pressure swing adsorption tail gas stream 244 such as by the separation process described above in conjunction with the pressure swing adsorption unit 140, as shown in FIG. 1. In accordance with certain embodiments, the pressure swing adsorption tail gas stream 244 can be provided at a pressure of about 138 kPa to about 172 kPa (about 20 to about 25 psia). In accordance with certain other embodiments, the hydrogen-enriched permeate stream 220 can be compressed prior to entering the pressure swing adsorption unit 240.

The hydrogen sulfide-enriched solvent stream 234 is subsequently treated in the hydrogen sulfide stripping zone 246 to produce a hydrogen sulfide-depleted solvent stream 248 and a hydrogen sulfide-enriched fluid stream 250 such as by the separation process described above in conjunction with the hydrogen sulfide stripping zone 146, as shown in FIG. 1. The hydrogen sulfide-depleted solvent stream 248 may be subsequently utilized in the absorption zone 214.

The hydrogen sulfide-enriched fluid stream 250 is treated in the sulfur recovery zone 252 to produce an elemental sulfur stream 254 and a sulfur recovery tail gas stream 256 such as by the process described above in conjunction with the sulfur recovery zone 152, as shown in FIG. 1.

In accordance with certain embodiments, one or more of a second portion 219 of the sulfur-free fluid stream 216, a second portion 225 of the first non-permeate stream 222, the carbon dioxide-enriched permeate stream 226, and the carbon dioxide-enriched fluid stream 232 can be combusted in the gas turbine 236 to produce an electrical power output 238.

The processing scheme 210 further involves combining at least a portion of the pressure swing adsorption tail gas stream 244, i.e., a first portion 245, with the sulfur recovery tail gas stream 256 to produce a combined tail gas stream 260 which can be subsequently treated in the absorption zone 214. For example, in accordance with certain embodiments, the combined tail gas stream 260 may be compressed in a compression train 258 to produce a compressed tail gas stream 262 at least a portion of which, i.e., a first portion 264, can be combined with the fluid stream 212. The resulting combined fluid stream 266 can be then be fed to the absorption zone 214. In accordance with certain embodiments, a second portion 247 of the pressure swing adsorption tail gas stream 244 can be removed or drawn off the processing scheme 210 for use in another process or processing unit.

Alternatively or additionally, all or at least a portion of the compressed tail gas stream 262 can be combined with a feed stream 268 and treated in a water shift reactor unit 270. For example, in accordance with certain embodiments, particularly embodiments in which increased production of hydrogen and/or carbon dioxide is desired, a second portion 272 of the compressed tail gas stream 262 can be combined with the feed stream 268 to provide a combined feed stream 274. The combined feed stream 274 can be treated in the water shift reactor unit 270 to provide the fluid stream 212.

Figure 3:
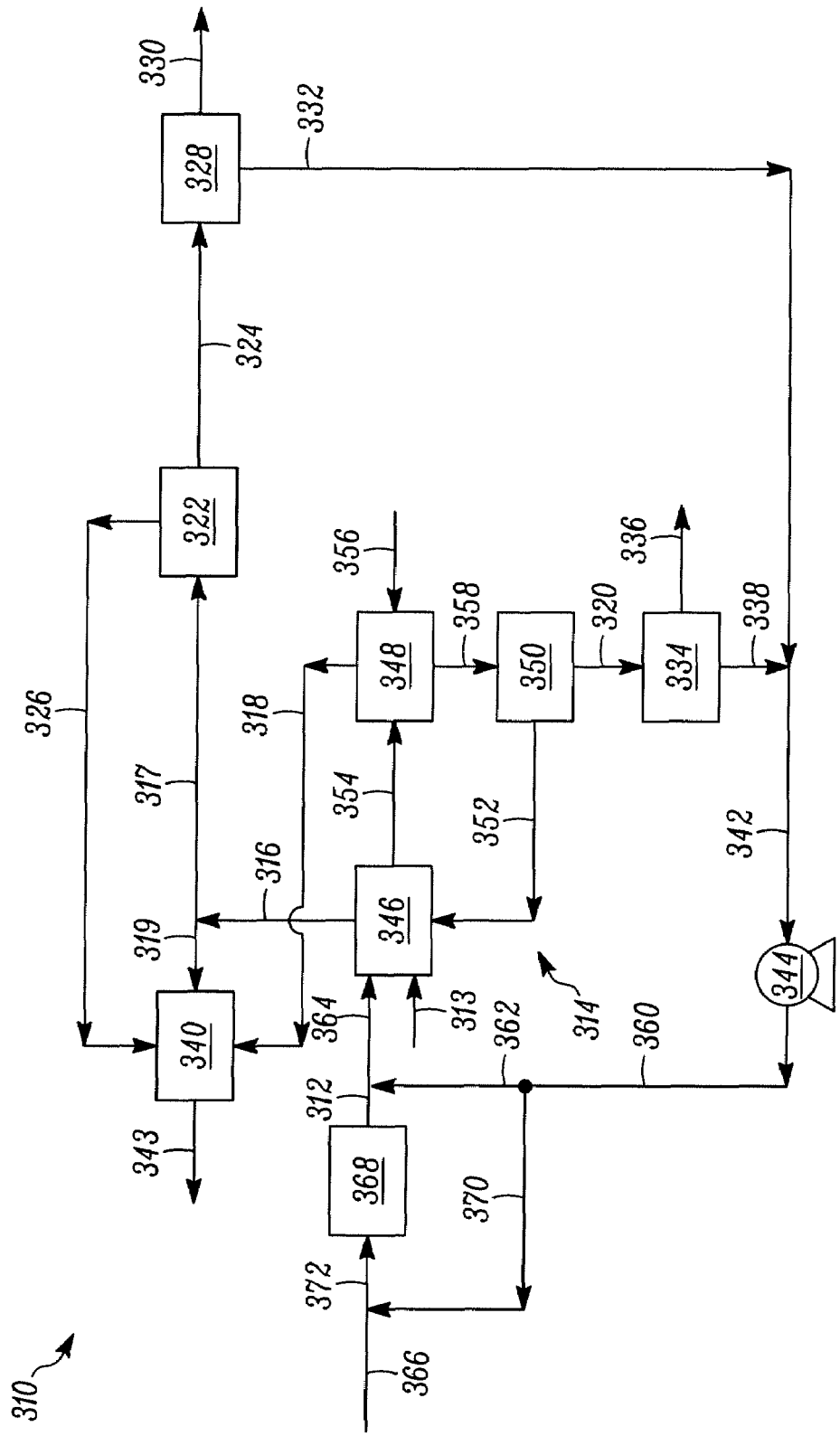
FIG. 3 is a simplified schematic of an improved processing scheme for the separation of hydrogen sulfide and carbon dioxide from a fluid stream containing at least hydrogen sulfide carbon dioxide and hydrogen in accordance with a further embodiment.

In accordance with a further embodiment, as shown in FIG. 3, a processing scheme 310 for separating hydrogen sulfide and carbon dioxide from a fluid stream 312 containing at least hydrogen sulfide, carbon dioxide and hydrogen involves contacting the fluid stream 312 with a physical solvent 313 in an acid gas separation zone 314 to produce a sulfur-free fluid stream 316 containing at least hydrogen and a portion of the carbon dioxide, a carbon dioxide-enriched fluid stream 318, and a hydrogen sulfide-enriched fluid stream 320 including at least hydrogen sulfide. Such streams 316, 318 and 320, respectively, can be produced, for example, using the separation processes described above in conjunction with the absorption zone 114, the carbon dioxide stripping zone 130, and the hydrogen sulfide stripping zone 146, as shown in FIG. 1.

A first portion 317 of the sulfur-free fluid stream 316 is subsequently treated in a membrane separation zone 322 by contacting at least one gas permeable membrane element to produce a hydrogen-enriched permeate stream 324 and a non-permeate stream 326 such as by the separation processes described above in conjunction with the first and/or second membrane separation zones, 118 and 124, respectively, as shown in FIG. 1.

At least a portion of the hydrogen-enriched permeate stream 324 is treated in a pressure swing adsorption unit 328 to produce a purified hydrogen stream 330 and a pressure swing adsorption tail gas stream 332 such as by the separation process described above in conjunction with the pressure swing adsorption unit 140, as shown in FIG. 1. In accordance with certain embodiments, the hydrogen-enriched permeate stream 324 can be compressed prior to entering the pressure swing adsorption unit 328.

The processing scheme 310 further involves treating at least a portion of the hydrogen sulfide-enriched fluid stream 320 in a sulfur recovery unit 334 to produce an elemental sulfur stream 336 and a sulfur recovery tail gas stream 338 such as by the separation process described above in conjunction with the sulfur recovery unit 152, as shown in FIG. 1.

At least a portion of the pressure swing adsorption tail gas 332 is combined with the sulfur recovery tail gas stream 338 to produce a combined tail gas stream 342. At least a portion of the combined tail gas stream 342 can be compressed in a compression train 344 to produce a compressed tail gas stream 360. At least a portion of compressed tail gas stream 360, such as, for example a first portion 362, can be combined with the fluid stream 312 to form a combined fluid stream 364 which may be treated in the acid gas separation zone 314 to recover or remove additional compounds per the process or processes described above in conjunction with processing scheme 110, as shown in FIG. 1.

Alternatively or additionally, all or at least a portion of the compressed tail gas stream 360 can be combined with a feed stream 366 and treated in a water shift reactor unit 368. For example, in accordance with certain embodiments, particularly embodiments in which increased production of hydrogen and/or carbon dioxide is desired, a second portion 370 of the compressed tail gas stream 360 can be combined with the feed stream 366 to form a combined feed stream 372. The combined feed stream 372 can be treated in the water shift reactor 368 to provide the fluid stream 312.

In accordance with certain embodiments, the acid gas separation zone 314 can include an absorption zone 346, a carbon dioxide stripping zone 348 and a hydrogen sulfide stripping zone 350 for separating carbon dioxide and hydrogen sulfide from the fluid stream 312. For example, the processing scheme 310 can further involve contacting the physical solvent 313 in the absorption zone 346 with the fluid stream 312 and/or combined fluid stream 364 to produce the sulfur-free fluid stream 316 and a hydrogen sulfide-rich solvent stream 354 containing at least hydrogen sulfide and a portion of the carbon dioxide. Such fluid streams 316 and 354, respectively, can be produced using the separation process as described above in conjunction with the absorption zone 114, as shown in FIG. 1.

The hydrogen sulfide-rich solvent stream 354 is treated in the carbon dioxide stripping zone 348 by contacting the hydrogen sulfide-rich solvent stream 354 with a sweeping gas stream 356 to produce the carbon dioxide-enriched fluid stream 318 and a hydrogen sulfide-enriched solvent stream 358. Such fluid streams 318 and 358, respectively, can be produced using the process as described above in conjunction with carbon dioxide stripping zone 130, as shown in FIG. 1.

In accordance with certain embodiments, one or more of a second portion 319 of the sulfur-free fluid stream 316, at least a portion of the non-permeate stream 326, and the carbon dioxide-enriched fluid stream 318 can be combusted in the gas turbine 340 to produce an electrical power output 343.

In accordance with certain embodiments, the sweeping gas stream 356 may be supplied from an external source such as, for example, from an air separation unit (not shown) which may be employed to produce an oxygen stream for an associated gasifier in an IGCC process.

In accordance with certain other embodiments, a portion of the non-permeate stream 326 can be used to supply the sweeping gas stream 356. In accordance with certain embodiments, up to about 10% by volume of the non-permeate stream 326 can be used to supply the sweeping gas stream 356. In accordance with such embodiments, the membrane separation zone 322 is advantageously and/or beneficially configured such that carbon dioxide entering the membrane separation zone 322 via the first portion 317 of the sulfur-free stream 316 permeates through the at least one gas separation membrane element and is collected in the hydrogen-enriched permeate stream 328 and the portion of the non-permeate stream 326 fed to the carbon dioxide stripping zone 348 includes less than about 5% volume, and, in accordance with certain embodiments, less than about 3% by volume, carbon dioxide.

In accordance with certain further embodiments, the membrane separation zone 322 can include at least one hollow fiber gas permeable membrane element connected in series with at least one spiral wound gas permeable membrane element. For example, the membrane separation zone 322 can include first and second membrane separation zones such as, for example, first membrane separation zone 118 and second membrane separation zone 124, as shown in FIG. 1, wherein the non-permeate stream 326 is treated in the second membrane separation zone to produce a non-permeate stream suitable for use as the sweeping gas stream 356.

In accordance with certain embodiments, the hydrogen sulfide-enriched solvent stream 358 is treated in the hydrogen sulfide stripping zone 350 to produce a hydrogen sulfide-depleted solvent stream 352 and the hydrogen sulfide-enriched fluid stream 320. In accordance with certain further embodiments, the hydrogen sulfide-depleted solvent stream 352 may be combined with the solvent stream 313 and utilized in the absorption zone 346. Such fluid streams 352 and 320, respectively, can be produced by the process described above in conjunction with the hydrogen sulfide stripping zone 146, as shown in FIG. 1.

As described above, the invention provides improved processes for separating hydrogen sulfide and carbon dioxide from a fluid stream containing at least hydrogen sulfide, carbon dioxide and hydrogen which employ at least portions of byproduct streams produced in the system. The invention further provides improved processes for separating hydrogen sulfide and carbon dioxide from a fluid stream containing at least hydrogen sulfide, carbon dioxide and hydrogen which recycles at least portions of select waste or byproduct streams to improve recovery of desirable products such as, for example, carbon dioxide and hydrogen.

As detailed herein, improvements and benefits realizable through the practice of such improved processes include, advantageously and/or economically employing one or more byproduct or waste streams produced by the process to support or facilitate certain steps within the process.

The invention illustratively disclosed herein suitably may be practiced in the absence of any element, step, part, component, or ingredient which is not specifically disclosed herein.

While in the foregoing detailed description of this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. A processing scheme for separating carbon dioxide from a fluid stream containing at least hydrogen sulfide, carbon dioxide and hydrogen, the processing scheme comprising:
    contacting the fluid stream with a solvent in an absorption zone to produce a sulfur-free fluid stream containing at least hydrogen and a first portion of the carbon dioxide, and a hydrogen sulfide-enriched solvent stream containing at least hydrogen sulfide and a second portion of the carbon dioxide;
    contacting at least one first gas separation membrane element in a first membrane separation zone with a first portion of the sulfur-free fluid stream to produce a hydrogen-enriched permeate stream and a first non-permeate stream containing at least carbon dioxide;
    contacting at least one second gas separation membrane element in a second membrane separation zone with a first portion of the first non-permeate stream to produce a carbon dioxide-enriched permeate stream and a second non-permeate stream; and
    contacting the hydrogen sulfide-rich solvent stream with at least a portion of the second non-permeate stream in a carbon dioxide stripping zone to produce a carbon dioxide-enriched fluid stream and hydrogen sulfide-enriched solvent stream.

2. The processing scheme of claim 1 wherein the solvent comprises a dimethyl ether of a polyethylene glycol.

3. The processing scheme of claim 1 wherein the at least one first gas permeable membrane element comprises at least one hollow fiber membrane element and the at least one second gas permeable membrane element comprises at least one spiral wound membrane element.

4. The processing scheme of claim 1 wherein the second non-permeate stream comprises less than about 5% by volume carbon dioxide.

5. The processing scheme of claim 1 additionally comprising combusting at least a portion of at least one of a second portion of the sulfur-free fluid stream, a second portion of the first non-permeate stream, the carbon dioxide-enriched permeate stream and the carbon dioxide-enriched fluid stream in a gas turbine.

6. The processing scheme of claim 1 additionally comprising treating the hydrogen-enriched permeate stream in a pressure swing adsorption unit to produce at least a purified hydrogen stream.

7. The processing scheme of claim 1 additionally comprising treating the hydrogen sulfide-enriched solvent in a hydrogen sulfide stripping zone to produce at least a hydrogen sulfide-depleted solvent stream.

8. The processing scheme of claim 7 additionally comprising combining the hydrogen sulfide-depleted solvent with the solvent in the absorption zone.

9. A processing scheme for separating hydrogen sulfide and carbon dioxide from an initial fluid stream containing at least hydrogen sulfide, carbon dioxide and hydrogen, the processing scheme comprising:

contacting the initial fluid steam with a solvent in an absorption zone to produce a sulfur-free fluid stream containing at least hydrogen and a first portion of the carbon dioxide, and a hydrogen sulfide-rich solvent stream containing at least hydrogen sulfide and a second portion of the carbon dioxide;

contacting at least one hollow fiber membrane element in a first membrane separation zone with a first portion of the sulfur-free fluid stream to produce a hydrogen-enriched permeate stream and a first non-permeate stream containing at least carbon dioxide;

contacting at least one spiral wound membrane element in a second membrane separation zone with a first portion of the first non-permeate stream to produce a carbon dioxide-enriched permeate stream and a second non-permeate stream, the second non-permeate stream containing less than about 5% by volume carbon dioxide;

contacting the hydrogen sulfide-rich solvent stream with at least a portion of the second non-permeate stream in a carbon dioxide stripping zone to produce a carbon dioxide-enriched fluid stream and a hydrogen sulfide-enriched solvent stream;

treating the hydrogen-enriched permeate stream in a pressure swing adsorption zone to produce a purified hydrogen stream and a pressure swing adsorption tail gas stream;

treating the hydrogen sulfide-enriched solvent in a hydrogen sulfide stripping zone to produce a hydrogen sulfide-enriched fluid stream and a hydrogen sulfide-depleted solvent stream;

treating the hydrogen sulfide-enriched fluid stream in a sulfur recovery zone to produce an elemental sulfur stream and a sulfur recovery tail gas stream;

combining at least a portion of the sulfur recovery tail gas stream with at least a portion of the pressure swing adsorption tail gas stream to produce a combined tail gas stream; and combining at least a first portion of the combined tail gas stream with the initial fluid stream prior to entering the absorption zone.

10. The processing scheme of claim 9 additionally comprising compressing the combined tail gas stream via a first compressor.

11. The processing scheme of claim 9 additionally comprising combining at least a portion of the hydrogen sulfide-depleted solvent with the solvent in the absorption zone.

12. The processing scheme of claim 9 additionally comprising:
combining at least a second portion of the combined tail gas stream with a feed stream to form a combined feed stream; and
treating the combined feed stream in a water shift reactor unit to provide the initial fluid stream.

13. A processing scheme for separating hydrogen sulfide and carbon dioxide from an initial fluid stream containing at least hydrogen sulfide, carbon dioxide and hydrogen, the processing scheme comprising:
contacting the initial fluid stream with a physical solvent in an acid gas separation zone to produce at least a sulfur-free fluid stream, a carbon dioxide-enriched fluid stream and a hydrogen sulfide-enriched fluid stream, the sulfur-free fluid stream including at least hydrogen and a portion of the carbon dioxide, and the hydrogen sulfide-enriched fluid stream including at least hydrogen sulfide;

contacting at least one gas permeable membrane element in a membrane separation zone with a first portion of the sulfur-free fluid stream to produce at least a hydrogen-enriched permeate stream and a non-permeate stream;

treating at least a portion of the hydrogen-enriched permeate stream in a pressure swing adsorption unit to produce a purified hydrogen stream and a pressure swing adsorption tail gas stream;

treating at least a portion of the hydrogen sulfide-enriched fluid stream in a sulfur recovery unit to produce a purified sulfur stream and a sulfur recovery tail gas stream;

combining at least a portion of the sulfur recovery tail gas stream and the pressure swing adsorption tail gas stream to produce a combined tail gas stream;

compressing the combined tail gas stream in a compression train to produce a compressed tail gas stream;

combining at least a first portion of the compressed tail gas stream with the initial fluid stream to produce a combined fluid stream; and treating the combined fluid stream in the acid gas separation zone.

14. The processing scheme of claim 13 wherein the non-permeate stream comprises less than about 5% by volume carbon dioxide.

15. The processing scheme of claim 14 additionally comprising contacting a hydrogen sulfide-enriched solvent stream, produced by contacting the initial fluid stream with the physical solvent in an absorption zone, with a first portion of the non-permeate stream to produce the carbon dioxide-enriched fluid stream and a hydrogen sulfide-enriched solvent stream.

16. The processing scheme of claim 15 additionally comprising treating the hydrogen sulfide-enriched solvent stream in a hydrogen sulfide stripping zone to produce a hydrogen sulfide-depleted solvent stream and the hydrogen sulfide-enriched fluid stream.

17. The processing scheme of claim 15 additional comprising combusting at least one of a second portion of the sulfur-free fluid stream, a second portion of the non-permeate stream and the carbon dioxide-enriched fluid stream in a gas turbine to produce an electrical power output.

18. The processing scheme of claim 13 additionally comprising treating a feed stream in a water shift reactor unit to provide the initial fluid stream.

19. The processing scheme of claim 18 additionally comprising:
combining at least a second portion of the compressed tail gas stream with the feed stream to form a combined feed stream; and
treating the combined feed stream in the water shift reactor unit to provide the initial fluid stream.

20. A system for separating hydrogen sulfide and carbon dioxide from a fluid stream containing at least hydrogen sulfide, carbon dioxide and hydrogen, the system comprising:
an absorbent zone wherein a solvent contacts the fluid stream to produce a hydrogen sulfide-rich solvent stream including at least hydrogen sulfide and a first portion of the carbon dioxide and a sulfur-free fluid stream including at least hydrogen and a second portion of the carbon dioxide;
at least one membrane separation zone including at least one gas permeable membrane element wherein a first portion of the sulfur-free fluid stream contacts the at least one gas permeable membrane element to produce a hydrogen-enriched permeate stream and a non-permeate stream;

a pressure swing adsorption unit wherein at least a portion of the hydrogen-enriched permeate stream is treated to produce a purified hydrogen stream and a pressure swing adsorption tail gas stream;

a carbon dioxide stripping zone wherein at least a portion of the non-permeate stream contacts the hydrogen sulfide-rich solvent stream to produce a hydrogen sulfide-enriched solvent stream and a carbon dioxide-enriched fluid stream;

a hydrogen sulfide stripping zone wherein at least a portion of the hydrogen sulfide-enriched solvent stream is treated to produce a hydrogen sulfide-depleted solvent stream and a hydrogen sulfide-enriched fluid stream; and a sulfur recovery unit wherein at least a portion of the hydrogen sulfide-enriched fluid stream is treated to produce a purified sulfur stream and a sulfur recovery tail gas stream.

* * * * *

UNITED STATES PATENT AND TRADEMARK OFFICE
CERTIFICATE OF CORRECTION

| | |
|---|---|
| PATENT NO. | : 7,637,984 B2 |
| APPLICATION NO. | : 11/537334 |
| DATED | : December 29, 2009 |
| INVENTOR(S) | : Eleftherios Adamopoulos |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 761 days.

Signed and Sealed this

Ninth Day of November, 2010

David J. Kappos
*Director of the United States Patent and Trademark Office*